(No Model.)
J. T. LOVELAND.
BRACKET.
No. 540,397. Patented June 4, 1895.
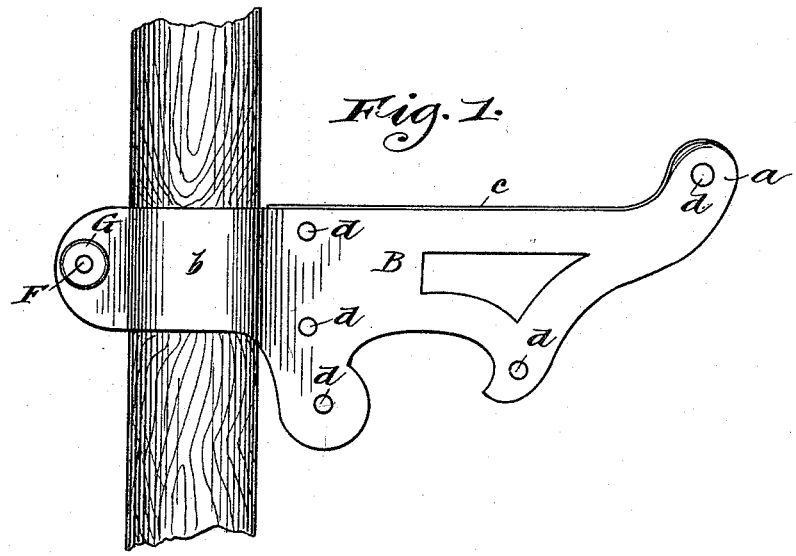
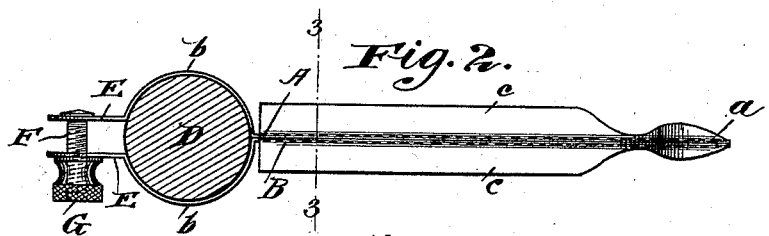
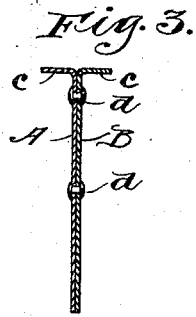
Witnesses,
Inventor,
John T. Loveland United States Patent Office.

JOHN T. LOVELAND, OF SHELDON, ILLINOIS.

BRACKET.

SPECIFICATION forming part of Letters Patent No. 540,397, dated June 4, 1895.

Application filed March 9, 1895. Serial No. 541,119. (No model.)

*To all whom it may concern:*

Be it known that I, JOHN T. LOVELAND, of Sheldon, Illinois, have invented certain new and useful Improvements in Brackets, of which the following is a specification.

This invention relates to a movable rest or bracket for easels and like articles; and the object of the invention is to provide a bracket of simple and strong construction which can be readily secured upon the poles or legs of an easel at various positions as to height from the floor.

The bracket is made from sheet metal and is composed of two mating parts of such form and so secured together that the structure is quite rigid.

In the drawings, Figure 1 is a side elevation showing a bracket applied to a pole. Fig. 2 is a plan view showing the pole in section. Fig. 3 is a cross-section on line 3 3 of Fig. 2.

The bracket consists of two mating members A, B, each constructed from sheet metal and having the integral up-turned extensions a, the rearwardly extending curved clamps b and the marginal flanges c. The parts A, B have their flanges extending, respectively, in opposite directions and their curved clamps also oppositely formed so as to adapt the parts when fitted together to provide by their marginal flanges a flat shelf or rest, and these flanges being continued over the extensions a form a stop or foot to prevent a picture or other article supported on the bracket from slipping off the end thereof. The clamping members are sufficiently flexible to adapt them to be sprung over a pole as D, or they may be slipped over its end. The clamping members terminate in straight ear pieces E, which are perforated and clamped together by means of a bolt F and nut G. The parts A, B are secured together by rivets d, or in any other preferred way.

I am aware that easel brackets have been constructed from sheet metal, but prior to my invention, so far as I am aware, no one has constructed an easel bracket from sheet metal having its members disposed edgewise to the line of strain and provided with integral flanges to form a rest and with curved extensions to form clamps.

By my construction I am enabled to make the device very strong and yet light and inexpensive.

The bracket members may be stamped or cut from sheet metal, and if desired punched at the same time and the curving of the clamped portions and the turning over of the flanges are quickly and cheaply performed even by hand, but may be done at a minimum cost and very rapidly by suitable machinery. Instead of riveting the two bracket members together they may be soldered together.

The invention may be applied to other articles than to easels, and, generally, wherever a pole, rod or bar is employed in connection with a bracket. The shape of the clamp may conform of course to the shape of the rod, pole or bar with which it is used, and therefore the clamp may be square, polygonal or other form than round.

I claim—

1. A sheet metal bracket constructed from two mating parts having integral flanges turned at right angles to the body and rearward extensions bent to provide clamps, and means for binding the clamping members together, substantially as described.

2. A sheet metal bracket composed of two members having reversely corresponding integral flanges and bent portions to provide clamps with perforated extensions to receive a binding screw and the forward ends of said bodies being upturned and flanged to provide a stop, substantially as described.

JOHN T. LOVELAND.

Witnesses:
N. M. BOND,
FREDERICK C. GOODWIN.